United States Patent [19]
Hangai et al.

[11] Patent Number: 5,136,560
[45] Date of Patent: Aug. 4, 1992

[54] CAV/CLV COMPOSITE DISK ACCESSING METHOD UTILIZING DIFFERENT ACCESSING PROCEDURES FOR RESPECTIVE CAV AND CLV AREAS

[75] Inventors: Toshimasa Hangai; Koichi Ishitoya, both of Tokorozawa, Japan

[73] Assignee: Pioneer Electronic Corporation, Tokyo, Japan

[21] Appl. No.: 407,760

[22] Filed: Sep. 15, 1989

[30] Foreign Application Priority Data

Feb. 21, 1989 [JP] Japan ................................ 1-41421

[51] Int. Cl.⁵ ............................................. G11B 7/085
[52] U.S. Cl. .................................. 369/32; 369/44.28; 369/54; 369/56
[58] Field of Search ............ 369/32, 33, 44.28, 44.35, 369/47, 50, 54, 56, 58

[56] References Cited
U.S. PATENT DOCUMENTS

| | | | |
|---|---|---|---|
| 4,723,235 | 2/1988 | Yasuda et al. | 369/32 X |
| 4,835,753 | 5/1989 | Yasuda | 369/32 |
| 4,882,719 | 11/1989 | Kimura et al. | 369/32 |
| 4,887,253 | 12/1989 | Tateishi | 369/32 |
| 4,926,405 | 5/1990 | Hangai et al. | 369/32 |
| 5,010,539 | 4/1991 | Terashima et al. | 369/50 |

FOREIGN PATENT DOCUMENTS 59-33632 2/1984 Japan .

Primary Examiner—Roy N. Envall, Jr.
Assistant Examiner—W. R. Young
Attorney, Agent, or Firm—Foley & Lardner

[57] ABSTRACT

On a composite CAV/CLV disc, information signals and identification codes indicative of the time-base positions of the information signals are recorded in at least first and second, radially different regions in CAV and CLV formats. To play back the composite CAV/CLV disc, the present position of an information reading spot applied to the disc is detected as a present position code according to an identification code read from the disc, and a destination position to which the information reading spot is to be jumped is detected as a destination position code. Then, the number of tracks to be jumped which corresponds to the difference between the present position code and the destination position code is calculated according to different functions when both the present and destination positions are in one of the first and second regions only and in the other region only. The information reading spot is moved from the present position to the destination position over a distance depending on the calculated number of tracks.

4 Claims, 3 Drawing Sheets

CAV/CLV COMPOSITE DISK ACCESSING METHOD UTILIZING DIFFERENT ACCESSING PROCEDURES FOR RESPECTIVE CAV AND CLV AREAS

BACKGROUND OF THE INVENTION

1. Field of the Invention

The present invention relates to a disc playback method, and more particularly to a method of playing back a composite CAV/CLV disc having a region in which information signals are recorded in a CAV (constant angular velocity) format and a region in which information signals are recorded in a CLV (constant linear velocity) format.

2. Description of the Related Art discloses a composite CAV/CLV disc. Commercially available CLV discs actually contain information signals that are recorded in a CAV format in the vicinity of a lead-in area on a radially inner section of the disc, as shown in FIG. 2 of the accompanying drawings.

As well known in the art, CLV discs can store more information than CAV discs, but are controllable less easily than CAV discs in special playback modes requiring track jumping such as still frame, search, and scan modes.

SUMMARY OF THE INVENTION

It is an object of the present invention to provide a disc playback method which is capable of well effecting special playback modes such as a search mode, a scan mode, etc. on composite CAV/CLV discs which incorporate the advantages of both CAV and CLV recording formats.

According to the present invention, there is provided a method of playing back a composite CAV/CLV disc on which information signals and identification codes indicative of the time-base positions of the information signals are recorded in at least first and second, radially different regions in CAV and CLV formats, the method comprising the steps of detecting the present position of an information reading spot applied to the disc as a present position code according to an identification code read from the disc, and then detecting a destination position to which the information reading spot is to be jumped as a destination position code, calculating the number of tracks to be jumped which corresponds to the difference between the present position code and the destination position code according to different functions when both the present and destination positions are in one of the first and second regions only and in the other region only, and moving the information reading spot from the present position to the destination position over a distance depending on the calculated number of tracks.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
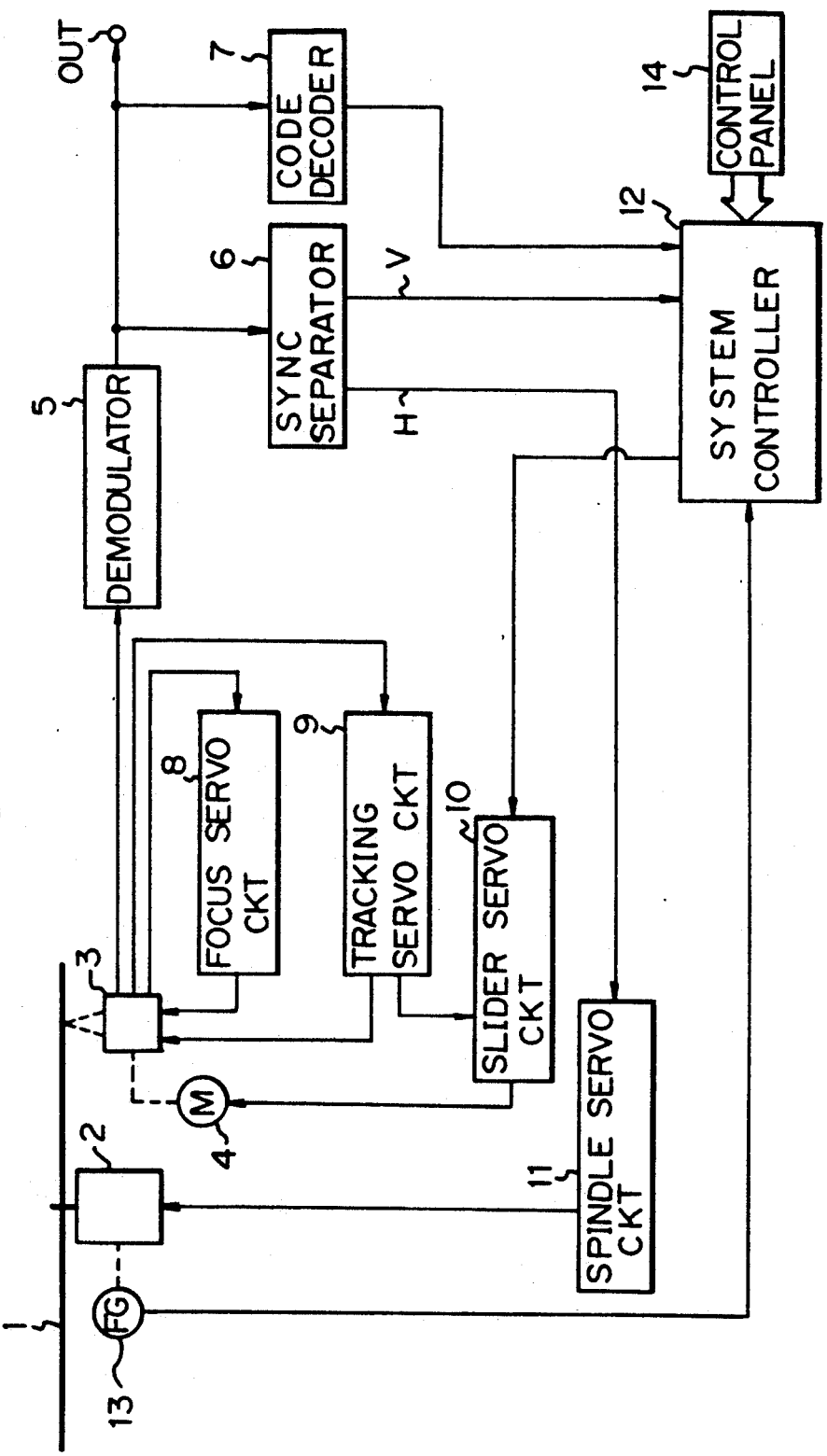
FIG. 1 is a block diagram of a disc playback device to which a disc playback method of the present invention is applicable.

Referring to FIG. 1, a disc 1 stores information signals such as video signals, audio signals, etc., and also identification codes such as time codes indicative of the time-base position of such information signals. The disc 1 includes a CAV region in which information signals are recorded in a CAV format, the CAV region including a lead-in area on the radially inner section of the disc and extending up to a prescribed radial position on the disc, and a CLV region in which information signals are recorded in a CLV format, the CLV region extending radially outwardly from the CAV region to a lead-out area on the radially outer section of the disc.

The composite CAV/CLV disc 1 is rotated about its own axis by a spindle motor 2, and the recorded information on the disc 1 is read by an optical pickup 3. The pickup 3 houses a laser diode, an optical system including an objective lens, a focusing actuator, a tracking actuator, a photodetector, etc. The pickup 3 is mounted on a slider (not shown) which is movable radially across the disc 1 by a slider motor 4. An RF signal which is produced as an information signal from the photodetector in the pickup 3 is supplied to a demodulator 5 comprising an FM demodulator. The demodulator 5 demodulates the supplied signal into a video signal, for example, which is then supplied to a sync separator 6, a code decoder 7, and a video output terminal OUT.

A focus servo circuit 8 generates a focus error signal through an astigmatic focusing system, for example, based on the output from the photodetector in the pickup 3, processes the focus error signal for phase compensation or the like, and supplies the processed focus error signal to the focusing actuator in the pickup 3. A tracking servo circuit 9 generates a tracking error signal through a three-beam system, for example, based on the output from the photodetector in the pickup 3, processes the tracking error signal for phase compensation or the like, and supplies the processed tracking error signal to the tracking actuator in the pickup 3. A low-frequency component of the tracking error signal is supplied to a slider servo circuit 10. The slider servo circuit 10 processes the low-frequency component of the tracking error signal for phase compensation or the like, and applies the processed signal to the slider motor 4.

The sync separator 6 separates a reproduced horizontal synchronizing signal H from the reproduced video signal, and supplies the horizontal synchronizing signal H to a spindle servo circuit 11. The spindle servo circuit 11 produces a control signal depending on the phase difference between the reproduced horizontal synchronizing signal H and a reference horizontal synchronizing signal from a reference signal generator (not shown), and supplies the control signal to the spindle motor 2. The spindle servo circuit H controls the rotational speed of the spindle motor 2 based upon such the phase difference between the reproduced horizontal synchronizing signal H and the reference horizontal synchronizing signal. The sync separator 6 also separates a reproduced vertical synchronizing signal V from the reproduced video signal. The code decoder 7 extracts and decodes code data from the reproduced video signal. The reproduced vertical synchronizing signal V and the decoded code data are applied to a system controller 12.

In response to rotation of the spindle motor 2, a frequency generator (FG) 13 generates a pulse signal having a frequency which is commensurate with the rotational speed of the spindle motor 2. The frequency generator 13 comprises, for example, a disc fixedly mounted on the rotatable shaft of the spindle motor 2 and having a series of slits defined in the peripheral edge of the disc at a constant pitch. The pulse signal is generated by applying a light beam to the slitted peripheral edge of the disc and detecting the light that has passed through the slits. The pulse signal is supplied to the system controller 12.

The system controller 12 comprises a microcomputer, for example. The system controller 12 is responsive to various commands from a control panel 14 for controlling the slider motor 4 through the slider servo circuit 10, and also controlling various mechanisms of the disc playback device. The system controller 12 also effects an arithmetic operation for detecting the rotational speed of the spindle motor 2 based on the pulse-to-pulse interval of the pulse signal supplied from the frequency generator 13, and an arithmetic operation for calculating the number of tracks to be jumped in special playback modes such as search and scan modes.

To playback a disc in a special playback mode such as a search mode, a scan mode, or the like on the disc playback device, the system controller 12 detects the present position of an information reading beam spot produced by the pickup 3 as a present position code according to an identification code (e.g., a time code) read from the disc 1, then recognizes a position to which the information reading beam spot is to be jumped as a destination position code, determines the number of tracks to be jumped which corresponds to the difference between the present position code and the destination position code, and finally controls the pickup 3 to move the information reading beam spot from the present position to the destination position over the distance corresponding to the determined number of tracks.

Figure 2:
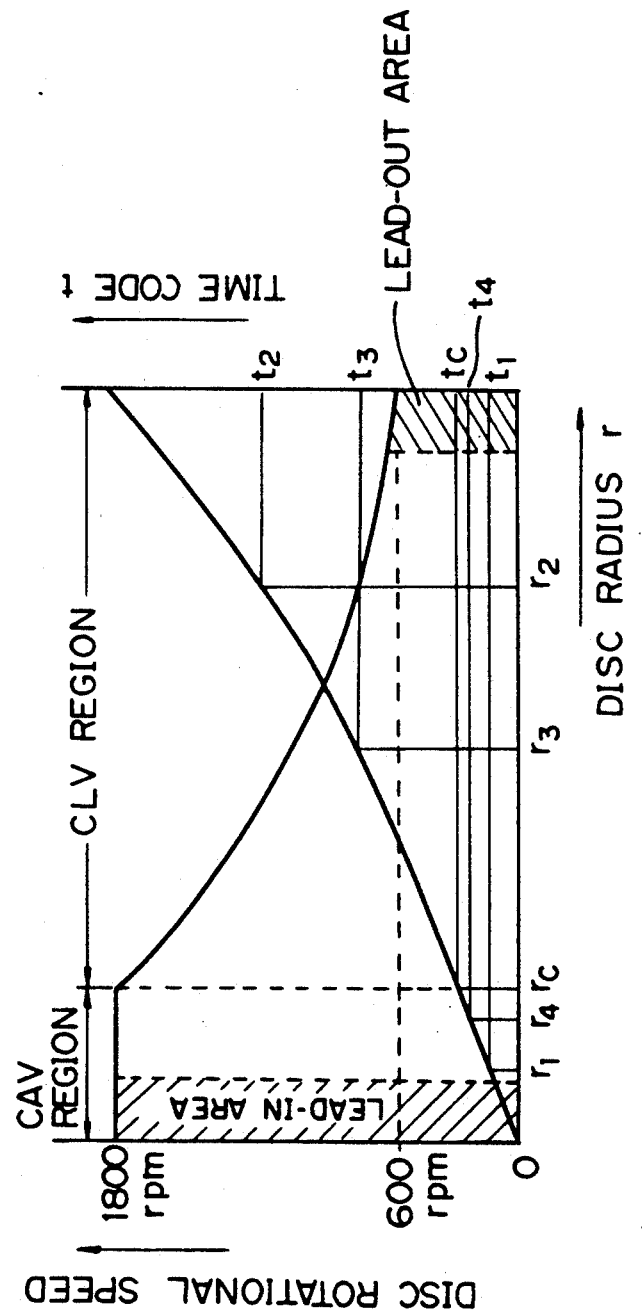
FIG. 2 is a diagram showing the relationship of a disc rotational speed and a time code to the radius of a composite CAV/CLV disc.

On the composite CAV/CLV disc 1, the time code t which indicates the time-base position of an information signal and the radius r of the disc 1 are linearly related (proportional) to each other in the CAV region, but nonlinearly related to each other in the CLV region, as shown in FIG. 2. Therefore, the number of tracks to be jumped which corresponds to the difference between the present position code and the destination position code must be calculated according to different functions in the CAV and CLV regions.

The linear velocity v, the track pitch p, and the disc radius r in the CLV region are related to each other according to the following equations:

$$r \cdot (d\theta/dt) = v \qquad \ldots (1)$$

$$dr/d\phi = p/2\pi \qquad \ldots (2)$$

From the equations (1 and (2), we get $$r \cdot \frac{d\theta}{dt} = r \cdot \frac{dr}{dt} \cdot \frac{2\pi}{p} = v \qquad (3)$$

Hence, $dt = (2\pi/pv) \cdot r \cdot dr$

If the CLV region is started from a time code tc and at a disc radius rc, then the equation (3) is integrated up to the time t and the disc radius r as follows:

$$\int_{tc}^{t} dt = \frac{2\pi}{pv} \int_{rc}^{r} r \cdot dr$$

Hence, $t - tc = (\pi/pv)r^2 - rc^2)$ $$r = \sqrt{(pv/\pi)(t - tc) + rc^2}$$

An actual procedure for determining the number of tracks to be jumped will be described below.

If the present position of the information reading beam spot is in the CAV region, and the information reading beam spot is to be jumped from the present position (at a disc radius $r_1$) to a certain position (at a disc radius $r_2$,) in the CLV region, then the number of tracks to be jumped will be calculated as follows: It is assumed that a time code for the disc radius $r_1$ is indicated by $t_1$, a time code for the disc radius $r_2$ by $t_2$, the number of tracks to be jumped from the time code point $t_1$ to the time code point tc by $T_1$, the number of tracks to be jumped from the time code point tc to the time code point $t_2$ by $T_2$. The total number T of tracks to be jumped from the point $t_1$ to the point $t_2$ is then determined by:

$$T = T_1 + T_2$$

With the CLV region starting from the time code tc at the disc radius rc, the numbers $T_1$, $T_2$ of tracks to be jumped are given by the respective equations:

$$T_1 = 30(tc - t_1)$$
$$T_2 = (r_2 - rc)/p$$
$$= \frac{\sqrt{\frac{pv}{\pi}(t_2 - tc) + rc^2} - rc}{p}$$

If both the present position of the information reading beam spot and the destination position are in the CLV region only, then the number T of tracks to be jumped is given by:

$$T =; (r_2 - r_3)/P$$

where $r_2$ is the disc radius at the present position and $R_3$ the disc radius at the destination position ($r_2 > R_3$). These disc radii $r_2$, $R_3$ are expressed as follows:

$$r_2 = \sqrt{(pv/\pi)(t_2 - tc) + rc^2}$$

$$r_3 = \sqrt{(pv/\pi)(t_3 - tc) + rc^2}$$

If both the present position of the information reading beam spot and the destination position are in the CAV region only, then the number T of tracks to be jumped is given by:

$$T = 30(t_4 - t_1)$$

where $t_1$ is the time code at the present position and $t_4$ the time code at the destination position ($t_4 > t_1$).

In a special playback mode on the composite CAV/CLV disc, as described above, the number of tracks to be jumped which corresponds to the difference between the present position code and the destination position code is calculated according to different functions when both the present and destination positions are in the CAV region only and in the CLV region only. If the present and destination positions are in the CAV and CLV regions, respectively, the total number of tracks to be jumped is determined by adding the numbers of tracks to be jumped in the CAV and CLV regions. Accordingly, the number of tracks to be jumped by the information reading beam spot from the present position to the destination position can accurately be calculated. As a result, a special playback mode such as a search or scan mode, for example, can well be effected on the composite CAV/CLV disc which relies on the advantages of both CAV and CLV recording formats.

Figure 3:
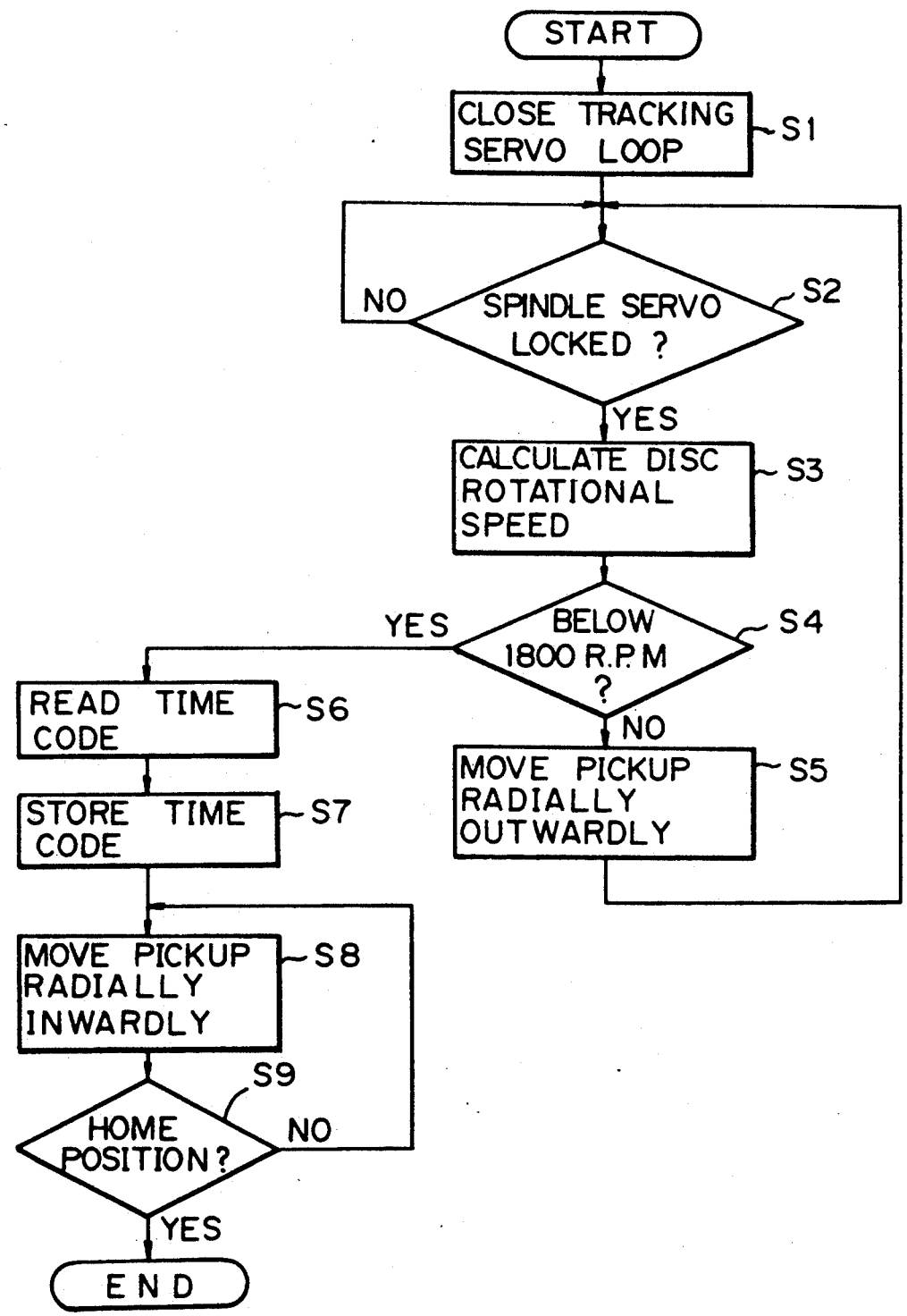
FIG. 3 is a flowchart of a procedure for storing a time code tc at which a CLV area starts.

In order to determine whether each of the present and destination positions of the information reading beam spot is in the CAV region or the CLV region, it is necessary to detect and store the time code tc at which the CLV region starts. The process of detecting and storing the time code tc is executed by the processor in the system controller 12 as shown by the flowchart of FIG. 3. The process shown in FIG. 3 is effected in an initial processing routine, for example, immediately after the disc playback device has been turned on.

The processor first closes the tracking servo loop in a step S2, and then determines whether the spindle servo loop for controlling the rotational speed of the spindle motor 2 so that the phase difference between the reproduced horizontal synchronizing signal H and the reference horizontal synchronizing signal becomes zero, is locked or not in a step S2. If the spindle servo loop is not locked, then the step S2 is repeatedly executed until the spindle servo loop is locked. If it is locked, the rotational speed of the disc 1 is calculated in a step S3 based on the pulse-to-pulse interval of the pulse signal supplied from the frequency generator 13. Then, a step S3 determines whether the rotational speed of the disc 1 is lower than 1,800 r.p.m. or not. If not lower than 1,800 r.p.m., then since the information reading beam spot of the pickup 3 is present in the CAV region, the slider servo circuit 10 is controlled to energize the slider motor 4 to move the pickup 3 radially outwardly on the disc 1 in a step S5.

If the rotational speed of the disc 1 is reduced below 1,800 r.p.m. while the information reading beam spot is moving from the inner peripheral edge toward the outer peripheral edge of the disc 1, then because the information reading beam spot enters from the CAV region into the CLV region, a time code decoded by the code decoder 7 at that time is read in a step S6, and stored in an inside memory such as a RAM in the processor as the time code tc which indicates the start of the CLV region in a step S7. Thereafter, the slider motor 4 is energized to move the pickup 3 at a high speed toward the inner peripheral edge of the disc 1 in a step S8. When the arrival of the pickup 3 to its home position is detected in a step S9, the process of detecting and storing the time code tc at which the CLV region starts is finished.

In the above embodiment, the CAV region includes a lead-in area on the radially inner section of the disc and extends up to a prescribed radial position on the disc, and the CLV extends radially outwardly from the CAV region to a lead-out area on the radially outer section of the disc. However, the disc to which the present invention is applicable is not limited to the illustrated composite CAV/CLV disc. The method of the invention is equally applicable to all discs on which information signals and identification codes such as time codes indicative of the time-base positions of such information signals are recorded in at least two radially different regions in CAV and CLV formats.

With the present invention, as described above, in a special playback mode on the composite CAV/CLV disc, the number of tracks to be jumped which corresponds to the difference between the present position code and the destination position code is calculated according to different functions when both the present and destination positions are in the CAV region only and in the CLV region only. If the present and destination positions are in the CAV and CLV regions, respectively, the total number of tracks to be jumped is determined by adding the numbers of tracks to be jumped in the CAV and CLV regions. Accordingly, the number of tracks to be jumped by the information reading beam spot from the present position to the destination position can accurately be calculated. As a result, a special playback mode such as a search or scan mode, for example, can well be effected on the composite CAV/CLV disc.

Although a certain preferred embodiment has been shown and described, it should be understood that many changes and modifications may be made therein without departing from the scope of the appended claims.

What is claimed is:

1. A method of playing back a composite constant angular velocity/constant linear velocity disc on which information signals and identification codes indicative of the time-based positions of the information signals are recorded in at least first and second, radially different regions corresponding to a constant angular velocity (CAV) region and a constant linear velocity (CLV) region, said method comprising steps of:

detecting the present position of an information reading spot applied to the disc as a present position code according to an identification code read from the disc, and then detecting a destination position to which the information reading spot is to be jumped as a destination position code;

calculating the number of tracks to be jumped which correspond to the difference between said present position code and said destination position code according to a first function when both said present and destination positions are in one of said first and second regions, and according to a second, different function when both said present and destination positions are in the other of said first and second regions; and moving said information reading spot from said present position to said destination over a distance depending on said calculated number of tracks.

2. A method according to claim 1, wherein when said present and destination positions are in different regions, respectively, the total number of tracks to be jumped is calculated by calculating a first number of tracks to be jumped in the region in which said present position is present and a second number of racks to be jumped in the region in which said destination position is present, according to said first and second functions, respectively, and adding said first and second numbers of tracks, and then said information reading spot is moved over a distance depending on said added number of tracks.

3. The method of claim 1, wherein, said first region is said CLV region and said second region is said CAV region and wherein when both said present and destination positions are in said CLV region, said calculating step includes calculating the number of tracks according to said first function which is equal to $(R_2 - R_3)/o$, and when both said present and destination positions are in said CAV region, said calculating step includes calculating the number of tracks according to said second function which is equal to $30(t_4 - t_1)$ where $r_2$ is a disc radius at said present position, $r_3$ is a disc radius at said destination position, p is a track pitch, $t_1$ is a time code at said present position, and $t_4$ is a time code at said destination position 4. The method of claim 3, wherein if said present position is in said CAV region and said destination position is in said CLV region, said calculating step includes calculating the number of tracks according to a third function which is equal to $$30(tc - t_1) + \frac{\sqrt{\frac{pv}{\pi}(t_2 - tc) + rc^2} - rc}{p}$$

where $r_2$ is a disc radius at said present position, $r_3$ is a disc radius at said destination position, $r_2$ is equal to $$r_2 = \sqrt{(pv/\pi)(t_2 - tc) + rc^2}$$

and $r_3$ is equal to $$r_3 = \sqrt{(pv/\pi)(t_3 - tc) + rc^2}$$

where p is a track pitch, v is a linear velocity, $t_2$ is a time code for $r_2$, $t_3$ is a time code for $r_3$, rc is a disc radius, tc is a time code for rc, $t_1$ is a time code at said present position, and $t_4$ is a time code at said destination position.

* * * * *